(12) United States Patent
Wu et al.

(10) Patent No.: US 12,475,694 B2
(45) Date of Patent: Nov. 18, 2025

(54) ITERATIVE DEEP GRAPH LEARNING FOR GRAPH NEURAL NETWORKS

(71) Applicants: International Business Machines Corporation, Armonk, NY (US); RENSSELAER POLYTECHNIC INSTITUTE, Troy, NY (US)

(72) Inventors: Lingfei Wu, Elmsford, NY (US); Yu Chen, Troy, NY (US); Mohammed J. Zaki, Troy, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 438 days.

(21) Appl. No.: 16/883,189

(22) Filed: May 26, 2020

(65) Prior Publication Data
US 2021/0374499 A1    Dec. 2, 2021

(51) Int. Cl.
| | |
|---|---|
| *G06F 16/90* | (2019.01) |
| *G06F 16/901* | (2019.01) |
| *G06F 17/16* | (2006.01) |
| *G06F 18/22* | (2023.01) |
| *G06F 18/23213* | (2023.01) |
| *G06N 3/044* | (2023.01) |
| *G06V 10/77* | (2022.01) |
| *G06V 10/82* | (2022.01) |

(52) U.S. Cl.
CPC .......... *G06V 10/82* (2022.01); *G06F 16/9024* (2019.01); *G06F 17/16* (2013.01); *G06F 18/22* (2023.01); *G06F 18/23213* (2023.01); *G06N 3/044* (2023.01); *G06V 10/7715* (2022.01)

(58) Field of Classification Search
CPC .................................................. G06F 16/9024
See application file for complete search history.

(56) References Cited

U.S. PATENT DOCUMENTS

| | | | |
|---|---|---|---|
| 9,911,211 B1* | 3/2018 | Damaraju | ........... G06F 16/9024 |
| 10,255,529 B2 | 4/2019 | Rabinovich et al. | |
| 10,402,655 B2 | 9/2019 | Javan Roshtkhari et al. | |
| 2010/0005134 A1 | 1/2010 | Zamir et al. | |
| 2017/0083623 A1* | 3/2017 | Habibian | ............. G06V 10/764 |
| 2019/0114537 A1* | 4/2019 | Wesolowski | ........... G06N 3/084 |
| 2019/0347523 A1* | 11/2019 | Rothberg | ............. G06N 3/0454 |
| 2020/0004835 A1* | 1/2020 | Ramanath | ............. G06F 16/248 |
| 2020/0005153 A1 | 1/2020 | Ramanath et al. | |

(Continued)

OTHER PUBLICATIONS

Wu et al., A Comprehensive Survey on Graph Neural Networks, arXiv preprint arXiv:1901.00596, Jul. 2019, 22 pages.

(Continued)

*Primary Examiner* — Mohammad S Rostami
(74) *Attorney, Agent, or Firm* — Caleb Wilkes; Otterstedt & Kammer PLLC

(57) ABSTRACT

An initial noisy graph topology is obtained and an initial adjacency matrix is generated by a similarity learning component using similarity learning and a similarity metric function. An updated adjacency matrix with node embeddings is produced from the initial adjacency matrix using a graph neural network (GNN). The node embeddings are fed back to revise the similarity learning component. The generating, producing, and feeding back operations are repeated for a plurality of iterations.

20 Claims, 8 Drawing Sheets

(56) References Cited

U.S. PATENT DOCUMENTS

| | | | |
|---|---|---|---|
| 2020/0134362 A1* | 4/2020 | Luo | G06V 10/764 |
| 2020/0167690 A1* | 5/2020 | Zhao | G06N 7/005 |
| 2020/0342182 A1* | 10/2020 | Johnson Premkumar | |
| | | | G06N 3/044 |
| 2020/0380342 A1* | 12/2020 | Wortsman | G06N 3/06 |
| 2021/0034737 A1* | 2/2021 | Khan | G06F 21/554 |
| 2021/0056428 A1* | 2/2021 | Palowitch | G06F 17/10 |
| 2021/0058345 A1* | 2/2021 | Yoon | H04L 51/02 |
| 2021/0065011 A1* | 3/2021 | Liu | G06N 3/045 |
| 2021/0081717 A1* | 3/2021 | Creed | G06N 5/022 |
| 2021/0089862 A1* | 3/2021 | Kim | G06V 10/7715 |
| 2021/0232918 A1* | 7/2021 | Cheng | G06N 3/084 |
| 2021/0326401 A1* | 10/2021 | Chng | G06N 3/04 |
| 2021/0334606 A1* | 10/2021 | Du | G06N 5/046 |
| 2021/0342701 A1* | 11/2021 | Ayush | G06N 3/0454 |
| 2021/0385682 A1* | 12/2021 | Bedekar | G06N 3/105 |
| 2022/0139504 A1* | 5/2022 | Wiltschko | G16C 20/80 |
| | | | 706/21 |

OTHER PUBLICATIONS

Zhou et al., Graph Neural Networks: A Review of Methods and Applications, arXiv preprint arXiv:1812.08434, Jul. 2019, 22 pages.

Disclosed Anonymously, Embedding of Pairwise Minimax Distance Measures in Classification Tasks, IP.com, IPCOM000252182D, Dec. 20, 2017, 12 pages.

Sellamanickam et al., Method of Providing Weight Space based Graph Regularization for Information Extraction from Web Pages, IP.com IPCOM000209868D, Aug. 18, 2011, 8 pages.

Yu Chen, Lingfei Wu, Mohammed J. Zaki, Iterative Deep Graph Learning for Graph Neural Networks, ICLR 2020 Conference Blind Submission Sep. 25, 2019. Cover sheets 1-9 plus pp. 1-14. (Grace Period Disclosure).

Franceschi et al., Learning discrete structures for graph neural networks, arXiv preprint arXiv:1903.11960, 2019.

Kalofolias et al., Large scale graph learning from smooth signals, arXiv preprint arXiv:1710.05654, 2017, 21 pages.

Shuman et al., The emerging field of signal processing on graphs: Extending high-dimensional data analysis to hetworks and other irregular domains, IEEE signal processing magazine 30, No. 3, 2013, pp. 83-98.

Kipf et al., Neural relational inference for interacting systems, arXiv preprint arXiv:1802.04687, 2018, 17 pages.

Mell et al., Recommendations of the National Institute of Standards and Technology, Special Publication 800-145, Sep. 2011, 7 pages.

Mell et al. The NIST Definition of Cloud Computing, Version 15, Oct. 7, 2009, National Institute of Standards and Technology, Information Technology Laboratory, 2 pages.

Belkin et al., Laplacian eigenmaps and spectral techniques for embedding and clustering. In Advances in neural information processing systems, pp. 585-591, 2002.

Belkin et al., Manifold regularization: A geometric framework for learning from labeled and unlabeled examples, Journal of machine learning research, 7 (Nov):2399-2434, 2006.

Chen et al., Graphflow: Exploiting conversation flow with graph neural networks for conversational machine comprehension. arXiv preprint arXiv:1908.00059, Jul. 2019.

Chen et al., Reinforcement learning based graph-to-sequence model for natural question generation. arXiv preprint arXiv:1908.04942, Aug. 2019.

Choi et al., Learning the Graphical Structure of Electronic Health Records with Graph Convolutional Transformer. arXiv preprint arXiv:1906.04716, Jun. 2019.

Dong et al., Learning Laplacian matrix in smooth graph signal representations, IEEE Transactions on Signal Processing, 64(23), pp. 6160-6173, Aug. 2016.

Dheeru Dua and Casey Graff. UCI machine learning repository, 2017. Downloaded Aug. 6, 2020, URL https://archive.ics.uci.edu/ml/index.php.

Egilmez et al., Graph learning from data under Laplacian and structural constraints, IEEE Journal of Selected Topics in Signal Processing, 11(6), pp. 825-841, Jul. 2017.

Franceschi et al., Learning discrete structures for graph neural networks. arXiv preprint arXiv:1903.11960, Mar. 2019.

Gao et al., DynGraph2Seq: Dynamic-Graph-to-Sequence Interpretable Learning for Health Stage Prediction in Online Health Forums. arXiv preprint arXiv:1908.08497, Aug. 2019.

Gilmer et al., Neural message passing for quantum chemistry, In Proceedings of the 34th International Conference on Machine Learning—vol. 70, pp. 1263-1272. JMLR. Apr. 2017.

Hamilton et al., Inductive representation learning on large graphs, In Advances in neural information processing systems, pp. 1024-1034, 2017.

Hochreiter et al., Long short-term memory, Neural computation, 9(8), pp. 1735-1780, Nov. 1997.

Hoshen, Vain: Attentional multi-agent predictive modeling, In Advances in Neural Information Processing Systems, pp. 2701-2711, Nov. 2017.

Jiang et al., Semi-supervised learning with graph learning-convolutional networks, In Proceedings of the IEEE Conference on Computer Vision and Pattern Recognition, pp. 11313-11320, Jun. 2019.

Kalofolias, How to learn a graph from smooth signals, In Artificial Intelligence and Statistics, pp. 920-929, May 2016.

Kingma et al., Adam: A method for stochastic optimization, arXiv preprint arXiv:1412.6980, Dec. 2014.

Kipf et al., Semi-supervised classification with graph convolutional networks, arXiv preprint arXiv:1609.02907, Sep. 2016.

Li et al., Adaptive graph convolutional neural networks, In Thirty-Second AAAI Conference on Artificial Intelligence, 8 pages, Apr. 2018.

Li et al., Gated graph sequence neural networks. International Conference on Learning Representations, 2016.

Li et al., Learning deep generative models of graphs, arXiv preprint arXiv:1803.03324, Mar. 2018, 21 pages.

Liu et al., Contextualized non-local neural networks for sequence learning, arXiv preprint arXiv:1811.08600, Nov. 2018.

Ma et al., Graph convolutional networks with eigenpooling, arXiv preprint arXiv:1904.13107, Apr. 2019, 9 pages.

Norcliffe-Brown et al., Learning conditioned graph structures for interpretable visual question answering, In Advances in Neural Information Processing Systems, pp. 8344-8353, 2018.

Pang et al., A sentimental education: Sentiment analysis using subjectivity summarization based on minimum cuts, In Proceedings of the 42nd annual meeting on Association for Computational Linguistics, pp. 271, Jul. 2004, 8 pages.

Samanta et al., Designing random graph models using variational autoencoders with applications to chemical design, arXiv preprint arXiv:1802.05283, Feb. 2018, 25 pages.

Sen et al., Collective classification in network data, AI magazine, 29(3): 93-93, Sep. 2008.

Sukhbaatar et al., Learning multiagent communication with back propagation, In Advances in Neural Information Processing Systems, pp. 2244-2252, 2016.

Van Steenkiste et al., Relational neural expectation maximization: Unsupervised discovery of objects and their interactions. arXiv preprint arXiv:1802.10353, Feb. 2018, 15 pages.

Vaswani et al., Attention is all you need, In Advances in neural information processing systems, pp. 5998-6008, 2017.

Velickovic et al., Graph attention networks, , arXiv preprint arXiv:1710.10903, Oct. 2017, 12 pages.

Weston et al., Deep learning via semisupervised embedding, In Neural Networks: Tricks of the Trade, pp. 639-655, Springer, 2012.

Xu et al., Graph2seq: Graph to sequence learning with attention-based neural networks. arXiv preprint arXiv:1804.00823, Apr. 2018, 18 pages.

Xu et al., Exploiting rich syntactic information for semantic parsing with graph-to-sequence model. arXiv preprint arXiv:1808.07624, Aug. 2018.

Xu et al., Sql-to-text generation with graph-to-sequence model, arXiv preprint arXiv:1809.05255, Sep. 2018, 6 pages.

(56) References Cited

OTHER PUBLICATIONS

Ying et al., Graph convolutional neural networks for web-scale recommender systems, In Proceedings of the 24th ACM SIGKDD International Conference on Knowledge Discovery & Data Mining, pp. 974-983. ACM, Jul. 2018.
Ying et al., Hierarchical graph representation learning with differentiable pooling, In Advances in Neural Information Processing Systems, pp. 4800-4810, 2018.
You et al., Graphrnn: Generating realistic graphs with deep autoregressive models. arXiv preprint arXiv:1802.08773, Feb. 2018, 12 pages.
Zhu et al., Semi-supervised learning using gaussian fields and harmonic functions, In Proceedings of the 20th International conference on Machine learning (ICML-03), pp. 912-919, 2003.

\* cited by examiner

600

LEARNED GRAPH

INITIAL GRAPH

ITERATIVE DEEP GRAPH LEARNING FOR GRAPH NEURAL NETWORKS

STATEMENT REGARDING PRIOR DISCLOSURES BY THE INVENTOR OR A JOINT INVENTOR

The following disclosure(s) are submitted under 35 U.S.C. 102(b)(1)(A):

Yu Chen, Lingfei Wu, Mohammed J. Zaki, Iterative Deep Graph Learning for Graph Neural Networks, ICLR 2020 Conference Blind Submission 25 Sep. 2019.

BACKGROUND

The present invention relates to the electrical, electronic and computer arts, and more specifically, to machine learning systems and the like.

Recent years have seen a significantly growing amount of interest in graph neural networks (GNNs), especially in efforts devoted to developing more effective GNNs for node classification, graph classification, and graph generation. Encouraged by this success, GNNs have been widely used in a variety of domain-specific applications such as machine reading comprehension, semantic parsing, natural language generation, and healthcare informatics.

Unfortunately, despite the powerful ability of GNNs for learning expressive node embeddings, GNNs can only be used when graph-structured data is available. Many real-world applications naturally admit network-structured data (e.g., social networks). These intrinsic graph-structures are not, however, always optimal for the supervised downstream tasks due to i) error-prone data measurement or collection; and ii) raw graphs constructed from the original feature space, which may not reflect the "true" graph topology after feature extraction and transformation. Moreover, many applications such as those in natural language processing may not have graph-structured input at hand, which requires additional graph construction during a preprocessing procedure.

SUMMARY

Principles of the invention provide techniques for iterative deep graph learning (IDGL) for graph neural networks. In one aspect, an exemplary method includes the operations of obtaining an initial noisy graph topology; generating, using a similarity learning component, an initial adjacency matrix using similarity learning and a similarity metric function; producing, from said initial adjacency matrix, using a graph neural network (GNN), an updated adjacency matrix with node embeddings; feeding back the node embeddings to revise the similarity learning component; and repeating the generating, producing, and feeding back operations for a plurality of iterations.

In one aspect, a non-transitory computer readable medium comprises computer executable instructions which when executed by a computer cause the computer to perform the method of obtaining an initial noisy graph topology; generating, using a similarity learning component, an initial adjacency matrix using similarity learning and a similarity metric function; producing, from said initial adjacency matrix, using a graph neural network (GNN), an updated adjacency matrix with node embeddings; feeding back the node embeddings to revise the similarity learning component; and repeating the generating, producing, and feeding back operations for a plurality of iterations.

In one aspect, an apparatus comprises a memory; and at least one processor, coupled to said memory, and operative to perform operations comprising obtaining an initial noisy graph topology; generating, using a similarity learning component, an initial adjacency matrix using similarity learning and a similarity metric function; producing, from said initial adjacency matrix, using a graph neural network (GNN), an updated adjacency matrix with node embeddings; feeding back the node embeddings to revise the similarity learning component; and repeating the generating, producing, and feeding back operations for a plurality of iterations.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

- end-to-end graph learning framework for jointly learning a graph structure and graph embedding;
- example method dynamically stops iterative learning when the learned graph structure is sufficiently similar to an optimized graph suitable for use in prediction;
- example definition of a graph structure learning problem as a graph similarity metric learning problem with adaptive graph regularization leveraged for controlling smoothness, connectivity and sparsity of the generated graph;
- methods are demonstrated to consistently match or outperform state-of-the-art baselines in terms of both downstream task performance and computational time;
- methods are more robust than numerous adversarial graph examples; and
- methods cope with both transductive and inductive learning.

These and other features and advantages of the present invention will become apparent from the following detailed description of illustrative embodiments thereof, which is to be read in connection with the accompanying drawings.

DETAILED DESCRIPTION

Figure 1:
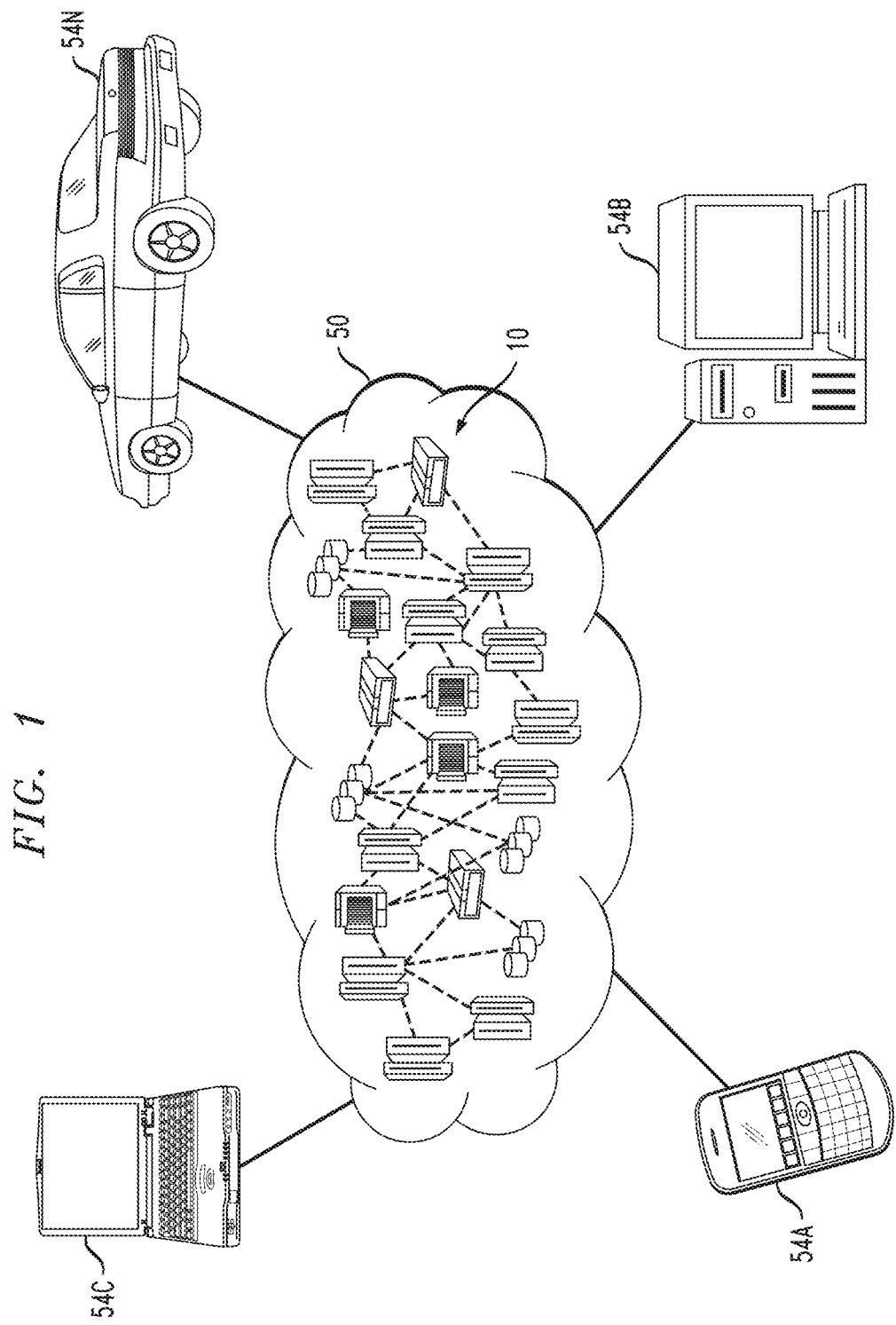
FIG. 1 depicts a cloud computing environment according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
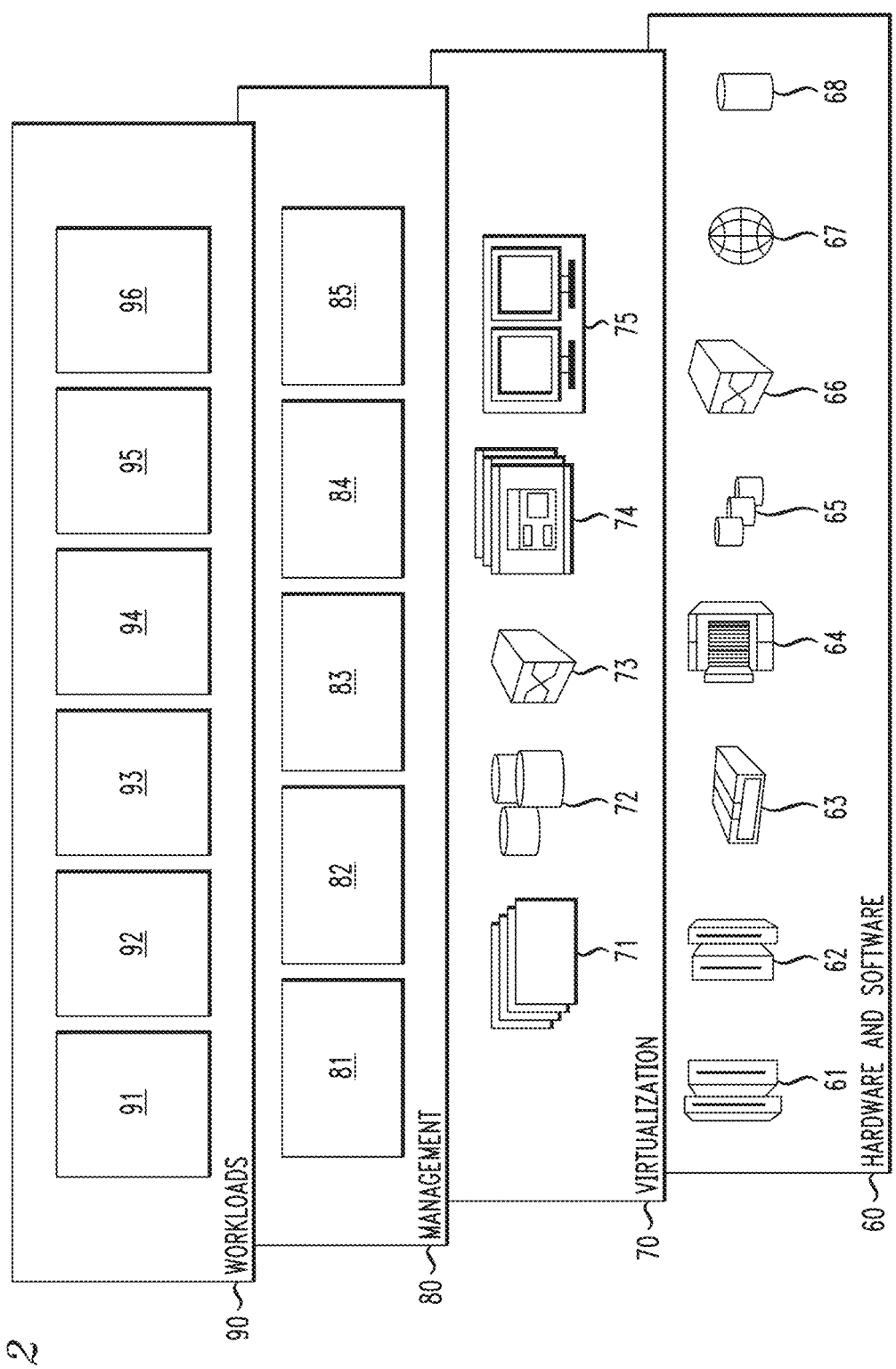
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud-based service 96 for jointly learning graph structures and graph embedding, it being understood that cloud, non-cloud, and combined approaches could be employed.

Generally, an end-to-end graph learning framework for iterative deep graph learning is disclosed. The framework provides for jointly learning graph structures and graph embeddings. One pertinent aspect of one or more embodiments of the framework is to learn a better graph structure based on better node embeddings, and vice versa (i.e., better node embeddings based on a better graph structure). In one example embodiment, the method dynamically stops when the learned graph structure is sufficiently similar to the corresponding optimized graph for use in prediction. In one example embodiment, the method dynamically stops after a predefined number of iterations.

In one example embodiment, the graph learning problem is cast as a similarity metric learning problem and adaptive graph regularization is leveraged for controlling the quality of the learned graph. Extensive experiments demonstrate that the disclosed techniques consistently outperform or match state-of-the-art baselines in terms of both downstream task performance and computational time. The techniques are also more robust to adversarial graphs and can cope with both transductive and inductive learning.

INTRODUCTION

Recent years have seen a significantly growing amount of interest in graph neural networks (GNNs), especially in efforts devoted to developing more effective GNNs for node classification, graph classification, and graph generation. Encouraged by this success, GNNs have been widely used in a variety of domain-specific applications such as machine reading comprehension, semantic parsing, natural language generation, and healthcare informatics.

Unfortunately, despite the powerful ability of GNNs for learning expressive node embeddings, GNNs can only be used when graph-structured data is available. Many real-world applications naturally admit network-structured data (e.g., social networks). These intrinsic graph-structures are not, however, always optimal for the supervised downstream tasks. This is partially because the raw graphs were constructed from the original feature space, which may not reflect the "true" graph topology after feature extraction and transformation. Another potential reason is that real-world graphs are often noisy due to the inevitably error-prone data measurement or data collection. Furthermore, many applications, such as those in natural language processing, may only have sequential data, or even just the original feature matrix, requiring additional graph construction from the original data matrix.

Independently, there has been an increasing amount of work studying the dynamic modeling of interacting systems utilizing implicit interaction models. These models can be viewed as message-passage-based GNNs that pass messages over the fully connected graph through the message passing function or the use of an attention mechanism. This has been further extended, where the problem was addressed by inferring an explicit interaction structure using a variational graph autoencoder. These methods, however, cannot be directly applied for jointly learning the graph structure and graph representation when the graph is noisy or not available.

More recently, a new approach has been used for jointly learning the graph and the parameters of the GNN, where a discrete probability distribution on the edges of the graph was learned by approximately solving a bilevel program. The experimental results achieved have shown promising performance in both cases where the input graph is either corrupted or not available. This approach, however, has quite significant scalability issues since it needs to learn $O(n^2)$ (Bernoulli) random variables to model the joint probability distribution on the edges of the graph containing n vertices. More importantly, one quite significant limitation of this work is that it essentially only optimizes the edge connectivities of the graph assuming the set of nodes are known, which makes it incapable of handling a new set of nodes during the testing (the inductive setting).

As described above, an end-to-end graph learning framework for iterative deep graph learning is disclosed. The framework provides for jointly learning graph structures and graph embedding(s). One pertinent aspect of the framework is to learn a better graph structure based on better node embeddings, and vice versa (i.e., better node embeddings based on a better graph structure). In particular, embodiments of the disclosed iterative method aim to search for a hidden graph structure that augments the initial graph structure with the goal of optimizing the graph for supervised prediction tasks. If the initial graph structure is not available, a K nearest neighbors (KNN) graph is used. The disclosed iterative method adjusts when to stop in each mini-batch, such as when the learned graph structure is similar enough to the optimized graph based on the given stopping criterion.

In one example embodiment, a graph learning neural network uses multi-head self-attention with epsilon-neighborhood sparsification for constructing a graph. Unlike previous techniques that directly optimize an n×n adjacency matrix without considering the downstream task, the disclosed graph metric learning function is learned by optimizing a joint loss that combines both task-specific prediction loss and graph regularization loss.

Iterative Deep Graph Learning Framework

Figure 3:
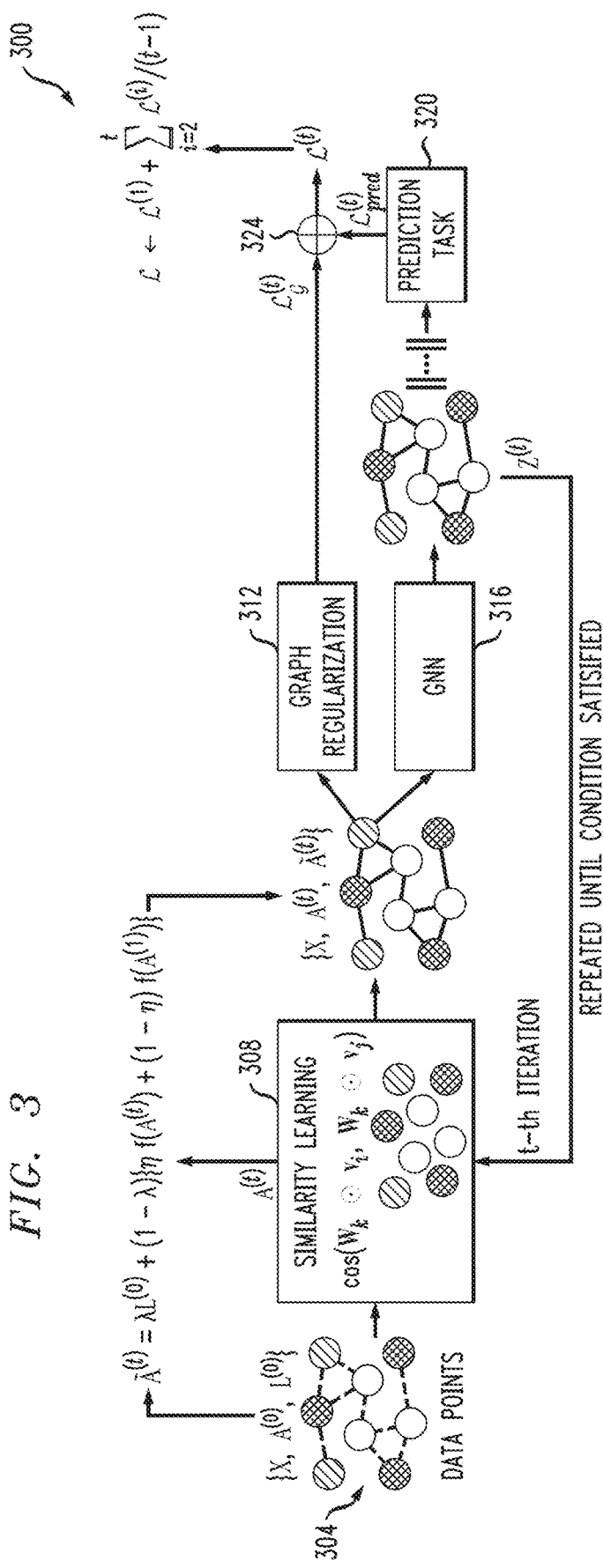
FIG. 3 illustrates an example high-level architecture for the IGDL framework, in accordance with an example embodiment.

FIG. 3 illustrates an example high-level architecture 300 for the IGDL framework, in accordance with an example embodiment. The dashed lines 304 (in the data points on the left) indicate the initial noisy graph topology $A^{(0)}$ either from the original data graph or from the graph constructed using the KNN strategy. A similarity learning component 308 generates $A^{(t)}$, the adjacency matrix learned at the t-th iteration, and a final graph $\tilde{A}^{(t)}$. A GNN 316 produces an updated adjacency matrix with node embeddings $Z^{(t)}$ which are fed back to the similarity learning component 308 (also referred to as a graph learner herein). The adjacency matrix is also operated on by a graph regularization component 312 which controls the smoothness, connectivity and sparsity of the learned graph by generating a graph regularization loss $\mathcal{L}_G$. In one example embodiment, the graph regularization loss $\mathcal{L}_G$ is based on a Frobenius norm of the generated matrix. A prediction task 320 generates a loss parameter $\mathcal{L}_{pred}$ based on a corresponding downstream task (for example, by comparing a model prediction with the ground-truth). The overall loss $\mathcal{L}$, generated by a summation component 324, is a summation of both $\mathcal{L}_{pred}$ (the task prediction loss) and $\mathcal{L}$ (the graph regularization loss).

In one or more embodiments, the similarity learning component 308 corresponds to high-level computer code that is compiled or interpreted into machine executable code that implements the logic in lines 7-8 of the pseudocode of FIG. 6, as described more fully below. In one or more embodiments, the GNN 316 corresponds to high-level computer code that is compiled or interpreted into machine executable code that implements the logic in lines 9-10 of the pseudocode of FIG. 6. In one or more embodiments, the prediction task 320 corresponds to high-level computer code that is compiled or interpreted into machine executable code that implements the logic in line 11 of the pseudocode of FIG. 6. In one or more embodiments, the graph regularization component 312 corresponds to high-level computer code that is compiled or interpreted into machine executable code that implements the logic in line 12 of the pseudocode of FIG. 6. In one or more embodiments, the summation component 324 corresponds to high-level computer code that is compiled or interpreted into machine executable code that implements the logic in line 13 of the pseudocode of FIG. 6.

Problem Formulation

Let the graph $G=(V,E)\in\mathcal{G}$ be represented as a set of n nodes $v_i\in V$ with an initial node feature matrix $X\in R^{d\times n}$, edges $(v_i,v_j)\in E$ (binary or weighted) formulating an initial noisy adjacency matrix $A^{(0)}\in R^{n\times n}$, and a degree matrix $D_{ii}^{(0)}=\Sigma_j A_{ij}^{(0)}$. Given a noisy graph input $G:=\{A^{(0)},X\}$ or only a feature matrix $X\in R^{d\times n}$, the deep graph learning problem produces an optimized graph $G^*:=\{A^{(*)}, X\}$ and its corresponding graph node embeddings $Z=f(G^*,\theta)\in R^{h\times n}$, with respect to some (semi-)supervised downstream task. It is worth noting that in one or more embodiments, the graph noise is assumed to originate only from graph topology (the adjacency matrix) and that the node feature matrix X is assumed to be noiseless. The more challenging scenario, where both graph topology and node feature matrix are noisy, can also be addressed by one or more embodiments. Without loss of generality, both node-level and graph-level prediction tasks are considered. Specifically, a deep graph learning model is trained based on a set of training pairs of graph-structured input and scalar output $(G_1,y_1), \ldots, (G_n,y_n)\in\mathcal{G}\times\mathcal{Y}$ drawn from some fixed but unknown probability distribution.

Graph Learning and Graph Embedding: A Unified Perspective

Graph topology is pertinent for a graph neural network to learn expressive graph node embeddings. Most of the existing GNN methods simply assume that the input graph topology is perfect, which is not necessarily true in practice, since real-world graphs are often noisy or incomplete. More importantly, the provided input graph(s) may not be ideal for the supervised downstream tasks, since most raw graphs are constructed from the original feature space, which may fail to reflect the "true" graph topology after high-level feature transformations. Conventional techniques have mitigated this issue by learning new node embeddings by reweighting the importance of neighborhood node embeddings using self-attention on previously learned node embeddings. However, this still assumes that the original graph connectivity information is noiseless.

Figure 4:
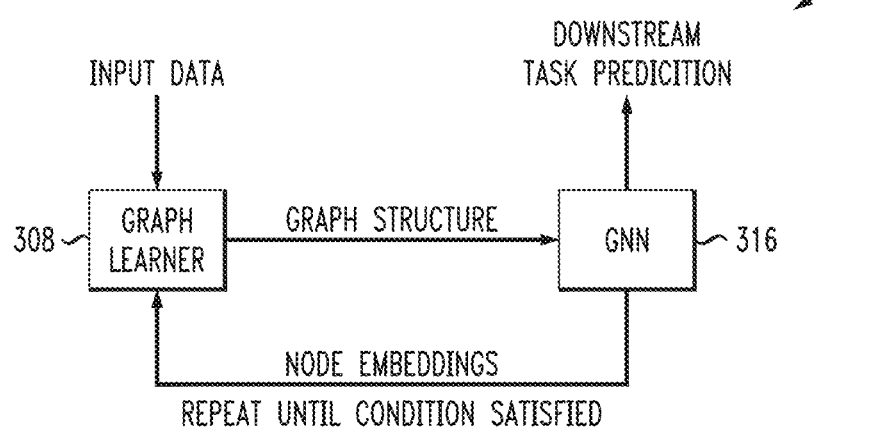
FIG. 4 is a high-level block diagram of an example IDGL framework, in accordance with an example embodiment.

FIG. 4 is a high-level block diagram of an example IDGL framework 400, in accordance with an example embodiment. To handle a potentially noisy input graph, the disclosed IDGL framework 400 formulates the problem as an iterative learning problem which jointly learns the graph structure and the GNN parameters. A significant aspect of the framework is to learn a better graph structure based on better node embeddings and, in turn, learn better node embeddings based on a better graph structure. In one example embodiment, the similarity learning component 308 (also referred to as a graph learner 404 herein) generates a graph structure based on the input data and the current node embeddings. A GNN 316 operates on the generated graph structure to generate the node embeddings. As illustrated in FIG. 4, unlike most existing methods that construct graphs based on raw node features, the node embeddings learned by the GNN 316 (optimized toward the downstream task) can provide useful information for learning better graph structures. On the other hand, the newly learned graph structures can provide a better graph input for GNNs to learn better node embeddings.

In particular, the IDGL framework 400 is based on an iterative method that searches for a hidden graph structure that augments the initial graph structure for supervised prediction tasks. If the initial graph structure is not available, a KNN graph is used. In one example embodiment, the iterative method adjusts when to stop in each mini-batch; for example, when the learned graph structure is sufficiently similar to the optimized graph (with respect to the downstream task) based on the given stopping criterion. Moreover, the process of constructing such a graph can be optimized towards the learning task at hand; in one or more embodiments, the whole learning system is end-to-end trainable.

Graph Learning as Similarity Metric Learning

Conventional techniques, which model the graph learning problem as learning a joint discrete probability distribution on the edges of the graph, have shown promising performance. However, since these techniques optimize the edge connectivities by assuming that the graph nodes are known, they are unable to cope with an inductive setting (with new nodes during testing). To overcome this issue, the graph structure learning problem solved by the graph learner 404 is cast as similarity metric learning, which will be jointly trained with the prediction model dedicated to a downstream task.

Graph Similarity Metric Learning

The common options for metrics include cosine similarity, radial basis function (RBF) kernel, and attention mechanisms. A good similarity metric function is supposed to be learnable and expressively powerful. Without loss of generality, a weighted cosine similarity is defined as an example metric function:

$$s_{ij}=\cos(w \odot v_i, w \odot v_j) \quad (1)$$

where $\odot$ denotes the Hadamard product, and w is a learnable weight vector which has the same dimension as the input vectors $v_i$ and $v_j$, and learns to highlight different dimensions of the vectors. Note that the two input vectors $v_i$ and $v_j$ could be either raw node features or computed node embeddings.

To stabilize the learning process, Eq. (1) is extended to a multi-head version. Specifically, m weight vectors (each one representing one perspective) are used to compute m independent similarity matrices using Eq. (1), and their average is taken as the final similarity:

$$s_{ij}^k = \cos(w_k \odot v_i, w_k \odot v_j), s_{ij} = \frac{1}{m}\sum_{k=1}^m s_{ij}^k \quad (2)$$

Intuitively, $s_{ij}^k$ computes the cosine similarity between the two input vectors $v_i$ and $v_j$ for the k-th perspective, where each perspective considers one part of the semantics captured in the vectors.

Graph Sparsification Via Epsilon-Neighborhood

Typically, an adjacency matrix (computed from a metric) is supposed to be non-negative, but $s_{ij}$ ranges between [−1, 1]. In addition, many underlying graph structures are much more sparse than a fully connected graph, which is not only computationally expensive but also might introduce noise (i.e., unimportant edges). A symmetric sparse adjacency matrix A is extracted from S by considering only the E-neighborhood for each node; specifically, those elements in S which are smaller than a non-negative threshold ε:

$$A_{ij} = \begin{cases} s_{ij} & s_{ij} > \varepsilon \\ 0 & \text{otherwise} \end{cases} \quad (3)$$

Graph Node Embeddings and Prediction

Although the initial graph can be noisy, it typically still carries rich and useful information regarding the true graph topology. Ideally, the learned graph structure A could be supplementary to the original graph topology $A^{(0)}$ to formulate an optimized graph for GNNs with respect to a downstream task.

Therefore, with the mild assumption that the optimized graph structure is potentially a shift from the initial graph structure, the learned graph is combined with the initial graph:

$$\tilde{A}^{(t)}=\lambda L^{(0)}+(1-\lambda)\{\eta f(A^{(t)})+(1-\eta)f(A^{(1)})\} \quad (4)$$

where $L^{(0)}$ is the normalized adjacency matrix of the initial graph, defined as, $L^{(0)}=D^{(0)-1/2}A^{(0)}D^{(0)-1/2}$, and $D^{(0)}$ is its degree matrix. $A^{(t)}$ and $A^{(1)}$ are the two adjacency matrices learned at the t-th and 1-st iterations using Eq. (2) and Eq. (3), respectively. The adjacency matrix learned by Eqs. (2) and (3) is row normalized such that each row sums to 1, so that $f(A)=A_{ij}/\Sigma_j A_{ij}$. Note that $A^{(1)}$ is computed from the raw node features while $A^{(t)}$ is computed from the intermediate node embeddings that usually reside on a low-dimensional manifold of the raw node feature space and are optimized towards the downstream prediction task. Therefore, the final learned graph structure is made as their linear combination weighted by a hyperparameter η. Finally, another hyperparameter λ is used to balance the trade-off between the learned graph structure and the initial graph structure. If such an initial graph structure is not available, a kNN graph constructed based on raw node features using cosine similarity is used instead.

Note that the graph learning framework is agnostic to various GNNs and prediction tasks. In one example embodiment, a two-layered graph convolutional network (GCN) is adopted where the first layer maps the node features to the intermediate embedding space (Eq. (5)), and the second layer further maps the intermediate node embeddings to the output space (Eq. (6)).

$$Z=\text{ReLU}(\tilde{A}XW_1) \quad (5)$$

$$\hat{y}=\sigma(\tilde{A}ZW_2) \quad (6)$$

$$\mathcal{L}_{pred}=\ell(\hat{y},y) \quad (7)$$

where $\tilde{A}$ is the normalized adjacency matrix, $\sigma(\cdot)$ is a task dependent output function, and $\ell(\cdot)$ is a task-dependent loss function. For instance, for node classification, $\sigma(\cdot)$ is a Softmax function for predicting a probability distribution over a set of classes, and $\ell(\cdot)$ is a cross-entropy function for computing the prediction loss.

Graph Regularization

Although combining the learned graph $A^{(t)}$ with the initial graph $A^{(0)}$ is an effective way to approach the optimized graph, the quality of the learned graph $A^{(t)}$ plays an important role in improving the quality of the final graph $\tilde{A}^{(t)}$. In practice, it is important to control the smoothness, connectivity and sparsity of the resulting learned graph $A^{(t)}$, which faithfully reflects the graph topology with respect to the initial node attributes X and the downstream task.

In graph signal processing, various methods have been explored to construct a graph from data points. These methods usually solve an optimization problem with certain assumptions on the graph signals or structural constraints on the underlying graphs, without considering a downstream task. One or more embodiments inventively adapt these techniques and apply them as regularization terms to the learned graph $A^{(t)}$.

Let each column of the feature matrix X be considered as a graph signal. A widely adopted assumption for graph signals is that values change smoothly across adjacent nodes. Given an undirected graph with a symmetric weighted adjacency matrix A, the smoothness of a set of n graph signals $x_1, \ldots, x_n \in \mathbb{R}^d$ is conventionally measured by the Dirichlet energy:

$$\Omega(A, X) = \frac{1}{2n^2} \sum_{i,j} A_{ij} \|x_i - x_j\|^2 = \frac{1}{n^2} tr(X^T L X) \quad (8)$$

where $tr(\bullet)$ denotes the trace of a matrix, $L=D-A$ is the graph Laplacian, and $D=\Sigma_j A_{ij}$ is the degree matrix. As can be seen, minimizing $\Omega(A,X)$ forces adjacent nodes to have similar features, thus enforcing smoothness of the graph signals on the graph associated with A. Solely minimizing the smoothness loss will, however, result in the trivial solution A=0. Also, it is desirable to have control of how sparse the resulting graph is. Additional constraints are imposed on the learned graph, $$f(A) = \frac{-\beta}{n} 1^T \log(A1) + \frac{\gamma}{n^2} \|A\|_F^2 \quad (9)$$

where $\|\bullet\|_F$ denotes the Frobenius norm of a matrix. The first term penalizes the formation of disconnected graphs via the logarithmic barrier, and the second term controls sparsity by penalizing large degrees due to the first term. The overall graph regularization loss is then defined as the sum of the above losses, which is able to control the smoothness, connectivity and sparsity of the learned graph, where $\alpha$, $\beta$ and $\gamma$ are all non-negative hyperparameters. A typical range of $\alpha$ is between 0 and 1; $\alpha$ controls the smoothness property of the learned graph (the higher the number, the more emphasis).

$$\mathcal{L} = \alpha \Omega(A,X) + f(A) \quad (10)$$

Joint Learning with a Hybrid Loss

Compared to techniques which directly optimize the adjacency matrix based on either some graph regularization loss, or some task-dependent prediction loss, an optimized graph structure is learned through a similarity metric function and the GNN parameters, by minimizing a joint loss function combining both the prediction loss defined on the downstream task and the graph regularization loss, namely, $\mathcal{L} = \mathcal{L}_{pred} + \mathcal{L}_{G}$.

Figure 6:
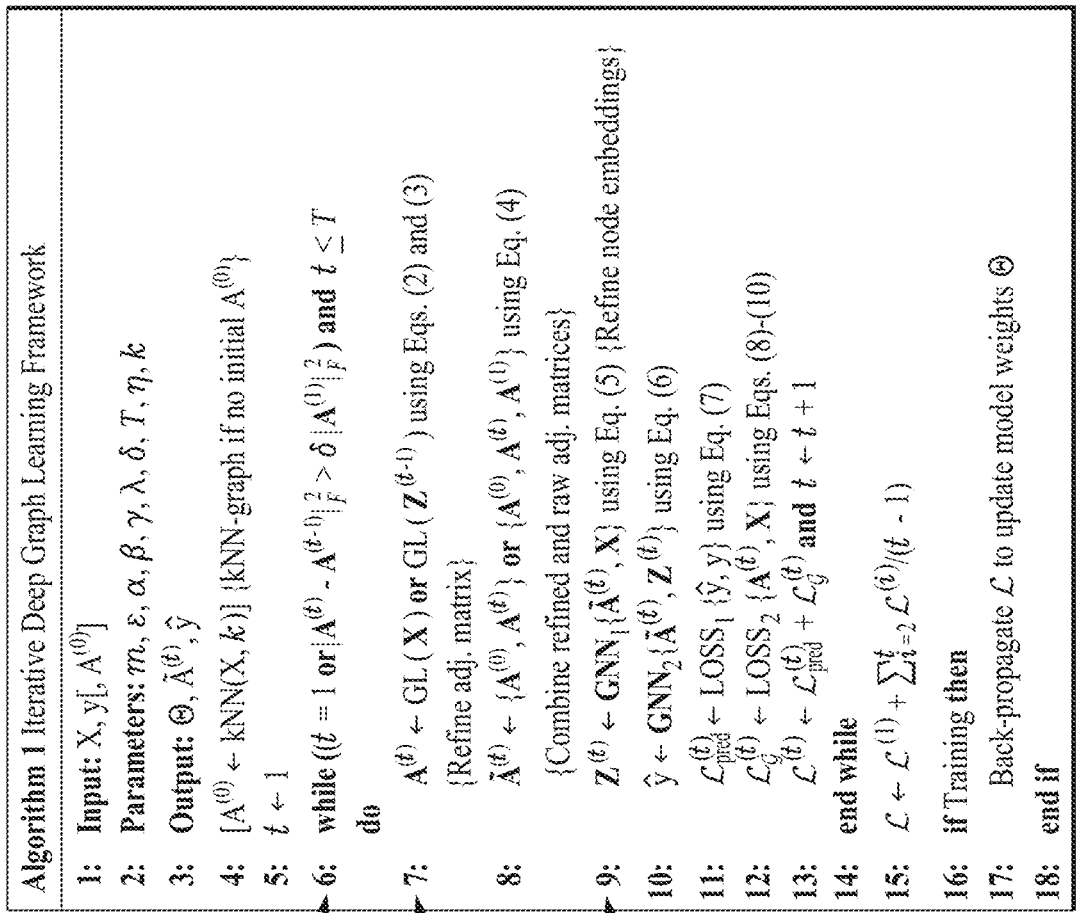
FIG. 6 is an example algorithm for the IDGL framework, in accordance with an example embodiment.

FIG. 6 is an example algorithm 600 for the IDGL framework 400, in accordance with an example embodiment. In one example embodiment, the logic in the pseudocode of the algorithm 600 is rendered in a high-level language and compiled or interpreted and thus made machine executable. It is noted that:

Lines 7-9 of FIG. 6 show that the algorithm repeatedly refines the adjacency matrix $\tilde{A}^{(t)}$ with the updated node embedding $Z^{(t-1)}$, and refines the node embeddings $Z^{(t)}$ with the updated adjacency matrix $\tilde{A}^{(t)}$;

Line 6 of FIG. 6 shows that the iterative procedure dynamically stops when the learned adjacency matrix converges (with a certain threshold $\delta$) or the maximum number of iterations is reached. Compared to using a fixed number of iterations globally, the advantage of applying this dynamically stopping strategy becomes clearer when mini-batch training is performed, since the time when the stopping is performed can be dynamically adjusted for each example graph in the mini-batch;

Line 7 of FIG. 6 shows a graph learning neural network that uses multi-head self-attention with epsilon-neighborhood sparsification for constructing a graph through a similarity metric function. An advantage of learning a similarity metric function instead of learning a joint discrete probability distribution on the edges of the graph is that the learned model can be easily generalized to unseen graphs in an inductive setting;

Line 12 of FIG. 6 show the strategy of training a graph learning model with a joint loss that combines graph regularization loss with the task-specific prediction loss (which has proven effective as demonstrated in numerous experiments); and Line 8 of FIG. 6 shows the strategy of combining the final learned graph structure and the initial graph structure, which plays an important role in providing more robust graph learning. If the initial graph structure is close to noiseless, then the hyperparameter will lean more on the initial graph structure than the learned graph. Otherwise, it will place a higher weight on the learned graph structure over the initial graph.

At each iteration, a joint loss that combines both the task dependent prediction loss and the graph regularization loss is computed (line 13 of FIG. 6). After all iterations, the overall loss is back-propagated through all previous iterations to update the model parameters (line 17 of FIG. 6).

Convergence Analysis

Figure 5:
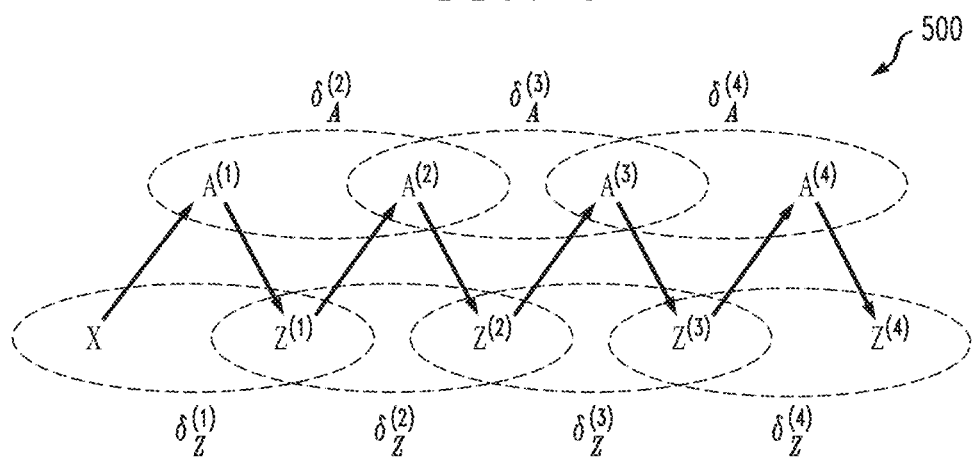
FIG. 5 shows the information flow of the learned adjacency matrix A and the intermediate node embedding matrix Z during the iterative procedure of the IDGL framework, in accordance with an example embodiment.

FIG. 5 shows the information flow 500 of the learned adjacency matrix A and the intermediate node embedding matrix Z during the iterative procedure of the IDGL framework 400, in accordance with an example embodiment. For the sake of simplicity, some variables are omitted, such as Ã. As illustrated in FIG. 5, at the t-th iteration, $A^{(t)}$ is computed based on $Z^{(t-1)}$ (Line 7), and $Z^{(t)}$ is computed based on $\tilde{A}^{(t)}$ (Line 9) which is computed based on $A^{(t)}$ (Eq. (4)). The difference between the adjacency matrices at the t-th iteration and the previous iteration is denoted by $\delta_A^{(t)}$. Similarly, the difference between the node embedding matrices at the t-th iteration and the previous iteration is denoted by $\delta_Z^{(t)}$.

Assuming that $\delta_Z^{(2)} < \delta_Z^{(1)}$, it is expected that $\delta_A^{(3)} < \delta_A^{(2)}$ because conceptually a more similar node embedding matrix (i.e., smaller $\delta_Z$) is supposed to produce a more similar adjacency matrix (i.e., smaller $\delta_A$) given the fact that model parameters are kept the same through iterations. Similarly, given that $\delta_A^{(3)} < \delta_A^{(2)}$, it is expected that $\delta_Z^{(3)} < \delta_Z^{(2)}$. Following this chain of reasoning, it can easily be extended to later iterations. In order to see why the assumption $\delta_Z^{(2)} < \delta_Z^{(1)}$ makes sense in practice, recall the fact that $\delta_Z^{(1)}$ measures the difference between $Z^{(1)}$ and X, which is usually larger than the difference between $Z^{(2)}$ and $Z^{(1)}$, namely $\delta_Z^{(2)}$. The convergence property of the iterative learning procedure is empirically examined in the experimental section below.

EXPERIMENTS

A series of experiments were conducted to verify the effectiveness of the IDGL framework 400 in both transductive and inductive settings. The details on data statistics and model settings are provided below.

Datasets and Baselines

The benchmarks used in the experiments include two network benchmarks, three data point benchmarks, and two text benchmarks. Cora and Citeseer are two commonly used network benchmarks for evaluating graph-based learning algorithms. The input features are bag of words and the task is node classification. In addition to Cora and Citeseer (where the graph topology is available), the IDGL framework 400 was evaluated on three data point benchmarks (i.e., Wine, Breast Cancer (Cancer) and Digits from the University of California-Irvine machine learning repository). The task is also node classification. Finally, to demonstrate the effectiveness of the IDGL framework 400 on inductive learning problems, document classification and regression tasks were conducted on the 20Newsgroups data (20News) and the movie review data (MRD), respectively, where a document was treated as a graph containing each word as a node. For the first five datasets, the experimental setup of learning discrete structures (LDS) was followed. For 20News, 30% examples were randomly selected from the training data as the development set. For MRD, the data was split to train/develop/test sets using a 60%/20%/20% split. The reported results are averaged over 5 runs with different random seeds. The skilled artisan is familiar with the various benchmarks mentioned and with LDS.

The main baseline is the learning discrete structures (LDS) technique which, however, is incapable of handling inductive learning problems. The experimental results of several semi-supervised (e.g., label propagation (LP), manifold regularization (ManiReg), semi-supervised embedding (SemiEmb) and supervised learning (logistic regression (LogReg), radial basis function support vector machine (RBF SVM) and feed-forward neural networks (FFNN)) baselines are reported in the LDS reference.

In addition, for network benchmarks where the graph topology is available, GCN and graph attention network (GAT) are included as baselines. For data point and text benchmarks where the graph topology is unavailable, a GCNkNN baseline is conceived where a kNN graph on the data set is constructed during preprocessing before applying a GCN. For text benchmarks, a bidirectional long short-term memory (BiLSTM) baseline is included.

Experimental Results

The results of transductive experiments are shown in the table below (test accuracy (±standard deviation) in percentage on various classification datasets in the transductive setting).

| Model | Cora | Citeseer | Wine | Cancer | Digits |
|---|---|---|---|---|---|
| LogReg | 60.8 (0.0) | 62.2 (0.0) | 92.1 (1.3) | 93.3 (0.5) | 85.5 (1.5) |
| RBF SVM | 59.7 (0.0) | 60.2 (0.0) | 94.1 (2.9) | 91.7 (3.1) | 86.9 (3.2) |
| FFNN | 56.1 (1.6) | 56.7 (1.7) | 89.7 (1.9) | 92.9 (1.2) | 36.3 (10.3) |
| LP | 37.8 (0.2) | 23.2 (6.7) | 89.8 (3.7) | 76.6 (0.5) | 91.9 (3.1) |
| ManiReg | 62.3 (0.9) | 67.7 (1.6) | 90.5 (0.1) | 81.8 (0.1) | 83.9 (0.1) |
| SemiEmb | 63.1 (0.1) | 68.1 (0.1) | 91.9 (0.1) | 89.7 (0.1) | 90.9 (0.1) |
| LDS | 84.1 (0.4) | 75.0 (0.4) | 97.3 (0.4) | 94.4 (1.9) | 92.5 (0.7) |

-continued

| Model | Cora | Citeseer | Wine | Cancer | Digits |
|---|---|---|---|---|---|
| GCN | 81.0 (0.2) | 70.9 (0.3) | — | — | — |
| GAT | 82.5 (0.4) | 70.9 (0.4) | — | — | — |
| $GCN_{kNN}$ | — | — | 95.9 (0.9) | 94.7 (1.2) | 89.5 (1.3) |
| LDS* | 83.9 (0.6) | 74.8 (0.3) | 96.9 (1.4) | 93.4 (2.4) | 90.8 (2.5) |
| IDGL | 84.5 (0.3) | 74.1 (0.2) | 97.8 (0.6) | 95.1 (1.0) | 93.1 (0.5) |

First, it can be seen that IDGL outperforms all baselines in 6 out of 7 benchmarks, which demonstrates its effectiveness. In addition, by comparing the results of GCN, GAT and IDGL on Cora and Citeseer, and considering that GCN is the underlying GNN module of IDGL, it can be concluded that the disclosed graph learning method can greatly help the node classification task even when the graph topology is given. When the graph topology is not available, compared to GCNkNN, IDGL consistently achieves much better results on all datasets, which shows the power of jointly learning graph structures and GNN parameters. Compared to LDS, IDGL achieves better performance in 4 out of 5 benchmarks. The results of inductive experiments are shown in the table below (test scores in percentage on classification (accuracy) and regression ($R^2$) datasets in the inductive setting). Unlike LDS which cannot handle an inductive setting, the good performance on 20News and MRD verifies the capability of IDGL on inductive learning.

| Methods | 20News | MRD |
|---|---|---|
| BiLSTM | 80.0 (0.4) | 53.1 (1.4) |
| $GCN_{kNN}$ | 81.3 (0.6) | 60.1 (1.5) |
| IDGL | 83.6 (0.4) | 63.7 (1.8) |

Ablation Study

An ablation study was performed to assess the impact of different model components. As shown in the table below, a significant performance drop consistently occurs on all datasets (e.g., 3.1% on Citeseer) by turning off the iterative learning component, indicating its effectiveness. The benefits of jointly training the model with the graph regularization loss can also be seen. For instance, when training the model without the graph regularization loss, the performance on Citeseer drops from 74.1% to 71.5%.

| Methods | Cora | Citeseer | Wine | Cancer | Digits | 20News |
|---|---|---|---|---|---|---|
| IDGL | 84.5 (0.3) | 74.1 (0.2) | 97.8 (0.6) | 95.1 (1.0) | 93.1 (0.5) | 83.6 (0.4) |
| w/o graph reg. | 84.3 (0.4) | 71.5 (0.9) | 97.3 (0.8) | 94.9 (1.0) | 91.5 (0.9) | 83.4 (0.5) |
| w/o IL | 83.5 (0.6) | 71.0 (0.8) | 97.2 (0.8) | 94.7 (0.9) | 92.4 (0.4) | 83.0 (0.4) |

Model Analysis

Figure 7A:
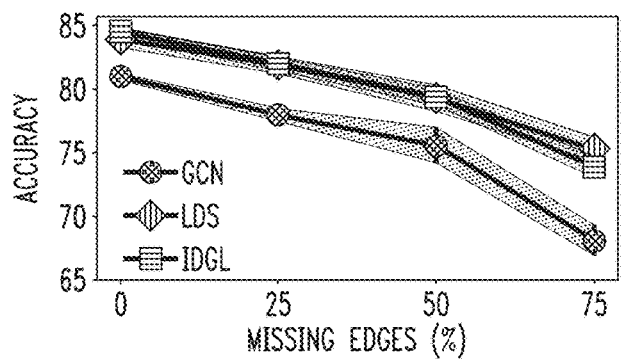
FIGS. 7A and 7B show the results of the edge deletion graphs and edge addition graphs, respectively, in accordance with an example embodiment.
Figure 7B:
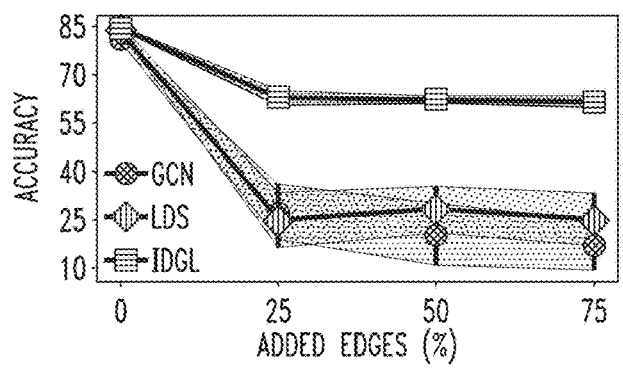

To evaluate the robustness of IDGL to adversarial graphs, graphs with random edge deletions or additions were constructed. Specifically, for each pair of nodes in the original graph, an edge was randomly removed (if an edge exists) or added (if no such edge) with a probability 25%, 50% or 75%. FIGS. 7A and 7B show the results of the edge deletion graphs and edge addition graphs, respectively, in accordance with an example embodiment. FIG. 7A shows the test accuracy (±standard deviation) in percentage for the edge deletion scenario on Cora and FIG. 7B shows the test accuracy (±standard deviation) in percentage for the edge addition scenario on Cora. As can be seen, compared to GCN and LDS, IDGL achieves better or comparable results in both scenarios and is more robust to adversarial graphs, especially in the edge addition scenario. While both GCN and LDS completely fail in the edge addition scenario, IDGL is still able to perform reasonably well. It is conjectured that this is because Eq. (4) is formulated as a form of skip-connection, by lowering the value of λ, and the model is enforced to rely less on the initial noisy graph that contains too much additive random noise.

Figure 7C:
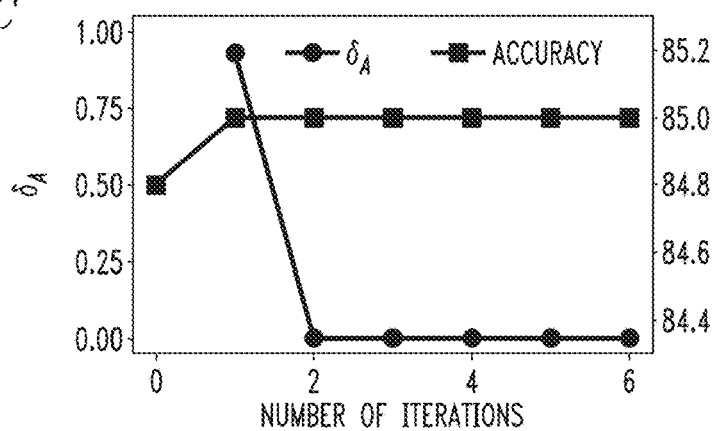
FIG. 7C shows the evolution of the learned adjacency matrix and accuracy through iterations in the iterative learning procedure in the testing phase, in accordance with an example embodiment.

FIG. 7C shows the evolution of the learned adjacency matrix and accuracy through iterations in the iterative learning procedure in the testing phase, in accordance with an example embodiment. The difference between adjacency matrices is computed at consecutive iterations as $$\delta_A^{(t)} = \|A^{(t)} - A^{(t-1)}\|_F^2 / \|A^{(t)}\|_F^2$$

which typically ranges from 0 to 1. As can be seen, both the adjacency matrix and accuracy converge quickly. This empirically verifies the analysis made on the convergence property of the iterative learning procedure in the section entitled Convergence Analysis.

Figure 7D:
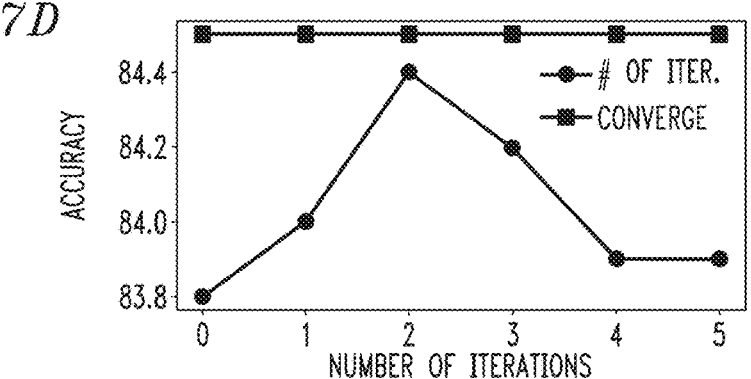
FIG. 7D shows an empirical comparison of the performance of the effectiveness of two stopping strategies for iterative learning methods, in accordance with an example embodiment.

FIG. 7D shows an empirical comparison of the performance of the effectiveness of two stopping strategies for iterative learning methods (test accuracy in %): i) using a fixed number of iterations (dot datapoints), and ii) using a stopping criterion to dynamically determine the convergence (square datapoints), in accordance with an example embodiment. IDGL was run on Cora using different stopping strategies with 5 runs and the average accuracy reported. As can be seen, dynamically adjusting the number of iterations using the stopping criterion works better in practice.

Figure 7F:
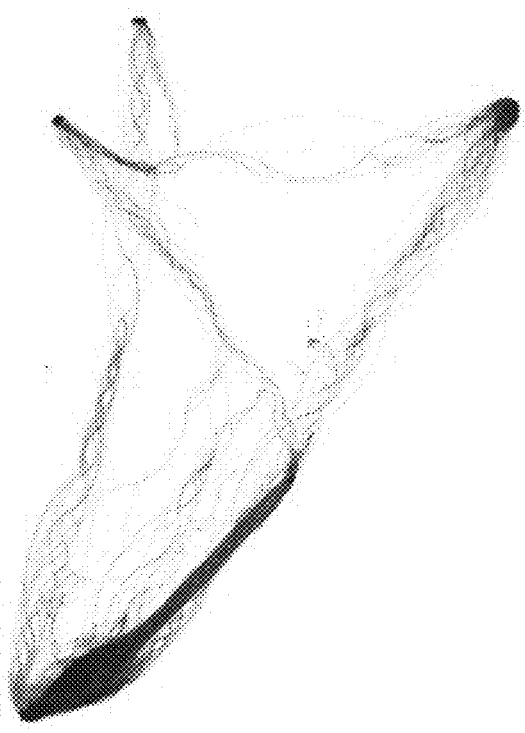
FIGS. 7E and 7F are visualizations of the initial graph structure and the learned graph structure ($A^{(t)}$) on Cora, respectively, in accordance with an example embodiment.
Figure 7E:
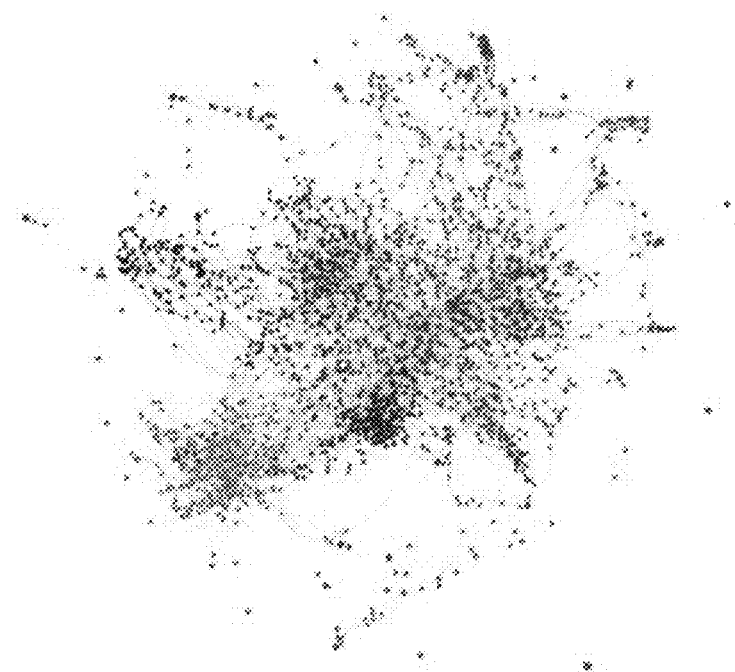

The graph structures (i.e., $A^{(t)}$) learned by IDGL are also visualized. As can be seen, compared to the initial graph structures, IDGL mainly forms graph structures within the same class of nodes, which complement the initial graph structure. This is as expected because $A^{(t)}$ is computed based on the updated node embeddings that are supposed to capture certain node label information. FIGS. 7E and 7F are visualizations of the initial graph structure and the learned graph structure ($A^{(t)}$) on Cora, respectively, in accordance with an example embodiment.

Timing

The training efficiency of IDGL, LDS and other classic GNNs (e.g., GCN and GAT) are compared on various benchmarks. The table below shows that both IDGL and LDS are slower than GCN and GAT, which is as expected since GCN and GAT do not need to learn graph structures. IDGL is consistently faster than LDS, but in general, they are comparable. Note that IDGL has comparable model size compared to LDS. For instance, on the Cora data, the number of trainable parameters of IDGL is 28,836, and for LDS, it is 23,040.

| Data | Cora | Citeseer | Wine | Cancer |
| --- | --- | --- | --- | --- |
| GCN | 3 (1) | 5 (1) | — | — |
| GAT | 26 (5) | 28 (5) | — | — |
| LDS | 390 (82) | 585 (181) | 33 (15) | 25 (6) |
| IDGL | 237 (21) | 563 (100) | 20 (7) | 21 (11) |
| w/o IL | 49 (8) | 61 (15) | 3 (2) | 3 (1) |

In the field of graph signal processing, researchers have explored various ways of learning graphs from data, with certain assumptions (e.g., smoothness) on the graph signals or structural constraints (e.g., connectivity and sparsity) on the underlying graphs. However, these works generally do not consider any downstream task that consumes the learned graph structures.

Over the past few years, graph neural networks (GNNs) have drawn increasing attention, and have many successful applications in computer vision, natural language processing and recommender systems. How to apply GNNs to applications where the underlying graph structures are unavailable becomes an emergent and challenging problem. However, manually constructing graphs from data heavily relies on domain knowledge and is not very scalable. Very recently, researchers have explored methods to automatically construct a graph of objects or words when applying GNNs to non-graph structured data. However, these methods merely optimize the graphs towards the downstream tasks without utilizing the techniques which have proven to be useful in graph signal processing.

More recently, the LDS model for jointly learning the graph and the parameters of GNNs has been proposed by leveraging the bilevel optimization technique. However, one big limitation of LDS is that it optimizes the discrete probability distribution on the edges of the graph, which makes it unable to handle the inductive setting.

A novel IDGL framework for jointly learning the graph structure and the GNN parameters that are optimized towards the prediction task at hand is disclosed. The disclosed method is able to iteratively search for hidden graph structures that better help the prediction task. The described extensive experiments demonstrate the effectiveness and efficiency of the disclosed model.

Given the discussion thus far, it will be appreciated that, in general terms, an exemplary method, according to an aspect of the invention, includes the operations of obtaining an initial noisy graph topology; generating, using a similarity learning component 308, an initial adjacency matrix using similarity learning and a similarity metric function; producing, from said initial adjacency matrix, using a graph neural network (GNN) 316, an updated adjacency matrix with node embeddings; feeding back the node embeddings to revise the similarity learning component 308; and repeating the generating, producing, and feeding back operations for a plurality of iterations.

In one example embodiment, a smoothness, a connectivity and a sparsity of a corresponding graph structure of the updated adjacency matrix is controlled by a graph regularization component using an adapted graph regularization technique. In one example embodiment, the similarity metric function comprises a weighted cosine similarity metric applied to obtain the updated adjacency matrix for all pairs of nodes of a corresponding graph structure. The weighted cosine similarity metric may be applied to an initial adjacency matrix $A^{(0)}$ or to a previous iteration of the adjacency matrix $A^{(t)}$ to obtain the updated adjacency matrix $A^{(t)}$.

In one example embodiment, the weighted cosine similarity metric is defined using m weight vectors w, each weight vector w representing one perspective, to compute m independent similarity matrices s, an average of the m independent similarity matrices s, and a final similarity s based on:

$$s_{ij}^k = \cos(w_k \odot v_i, w_k \odot v_j), \, s_{ij} = \frac{1}{m}\sum_{k=1}^{m} s_{ij}^k$$

where $s_{ij}^k$ computes a cosine similarity between input vectors $v_i$ and $v_j$ for a k-th perspective, where each perspective considers one part of semantics captured in the input vectors $v_i$ and $v_j$. In one example embodiment, the adjacency matrix is designated as $A^{(t)}$ and is extracted from S by considering elements in S which are smaller than a non-negative threshold ε in an ε-neighborhood for each node, where:

$$A_{ij} = \begin{cases} s_{ij} & s_{ij} > \varepsilon \\ 0 & \text{otherwise} \end{cases}$$

In one example embodiment, the weighted cosine similarity metric is defined as:

$$s_{ij} = \cos(w \odot v_i, w \odot v_j)$$

where $\odot$ denotes a Hadamard product and w comprises a learnable weight vector which has a same dimension as input vectors $v_i$ and $v_j$. In one example embodiment, each input vector $v_i$ and $v_j$ comprises one of raw node features and computed node embeddings. In one example embodiment, the updated adjacency matrix is learned by minimizing a joint loss function $\mathcal{L}$ based on $\mathcal{L} = \mathcal{L}_{pred} + \mathcal{L}_G$, where $\mathcal{L}_{pred}$ is a prediction loss based on a downstream task and $\mathcal{L}_G$ is a graph regularization loss. In one example embodiment, the graph regularization loss $\mathcal{L}_G$ is defined by:

$$\mathcal{L}_G = \alpha \Omega(A,X) + f(A)$$

where $\alpha$ is a non-negative hyperparameter, A is an adjacency matrix, X is a feature matrix, and $\Omega(A,X)$ is a smoothness loss. In one example embodiment, $\mathcal{L}_G$ is based on a Frobenius norm of the updated adjacency matrix. In one example embodiment, the initial noisy graph topology is obtained from one of an original data graph and a graph constructed using a k-nearest neighbors (kNN) strategy, the graph is based on sequential data or a feature matrix of a corresponding application. In one example embodiment, an iteration of the updated adjacency matrix is selected as a replacement for the initial noisy graph topology. In one example embodiment, the repeating the generating, producing, and feeding back operations continues until a corresponding updated adjacency matrix designated $A^{(t)}$ as is sufficiently similar to a corresponding optimized graph for use in prediction based on a threshold $\varepsilon$ to derive a final graph $\tilde{A}^{(t)}$. It is noted that there is no need to determine the optimized graph per se; a graph that is sufficiently similar to a corresponding optimized graph based on the threshold $\varepsilon$ is sufficient for the downstream task. In one example embodiment, the final graph $\tilde{A}^{(t)}$ is derived based on:

$$\tilde{A}^{(t)} = \lambda L^{(0)} + (1-\lambda)\{\eta f(A^{(t)}) + (1-\eta) f(A^{(1)})\}$$

where $\eta$ is a hyperparameter, $\lambda$ is a hyperparameter used to balance a trade-off between the updated adjacency matrix $A^{(t)}$ and the initial noisy graph topology designated as $A^{(0)}$, $L^{(0)}$ is a normalized adjacency matrix of the initial noisy graph topology $A^{(0)}$, defined as $L^{(0)} = D^{(0)-1/2} A^{(0)} D^{(0)-1/2}$, and where $D^{(0)}$ is a corresponding degree matrix. In one example embodiment, the repeating the generating, producing, and feeding back operations continues for a predefined number of iterations.

In one aspect, a non-transitory computer readable medium comprises computer executable instructions which when executed by a computer cause the computer to perform the method of obtaining an initial noisy graph topology; generating, using a similarity learning component 308, an initial adjacency matrix using similarity learning and a similarity metric function; producing, from said initial adjacency matrix, using a graph neural network (GNN) 316, an updated adjacency matrix with node embeddings; feeding back the node embeddings to revise the similarity learning component 308; and repeating the generating, producing, and feeding back operations for a plurality of iterations.

In one aspect, an apparatus comprises a memory; and at least one processor, coupled to said memory, and operative to perform operations comprising obtaining an initial noisy graph topology; generating, using a similarity learning component 308, an initial adjacency matrix using similarity learning and a similarity metric function; producing, from said initial adjacency matrix, using a graph neural network (GNN) 316, an updated adjacency matrix with node embeddings; feeding back the node embeddings to revise the similarity learning component 308; and repeating the generating, producing, and feeding back operations for a plurality of iterations.

As noted elsewhere, heretofore, it has only been possible to use GNNs when graph-structured data is available. One or more embodiments advantageously enable the use of GNNs on data where their use has heretofore not been possible ("problematic input"). These include, e.g., cases where raw graphs were constructed from the original feature space, which may not reflect the "true" graph topology after feature extraction and transformation; where graphs are noisy due to the inevitably error-prone data measurement or collection; or where only have sequential data or even just the original feature matrix is available. One non-limiting example of an application where GNNs have not been successfully used due to data limitations is natural language processing. In one example embodiment, natural language processing is performed on input from a human subject (for example, for a call center) using a selected iteration of the updated adjacency matrix. Suitable use can be made of the results of the natural language processing; for example, at least one network-based asset (see generally FIGS. 1 and 2 for non-limiting examples of various assets) is reconfigured in accordance with a result of the natural language processing. In general, processing can be performed on problematic input using a selected iteration of the updated adjacency matrix.

Figure 8:
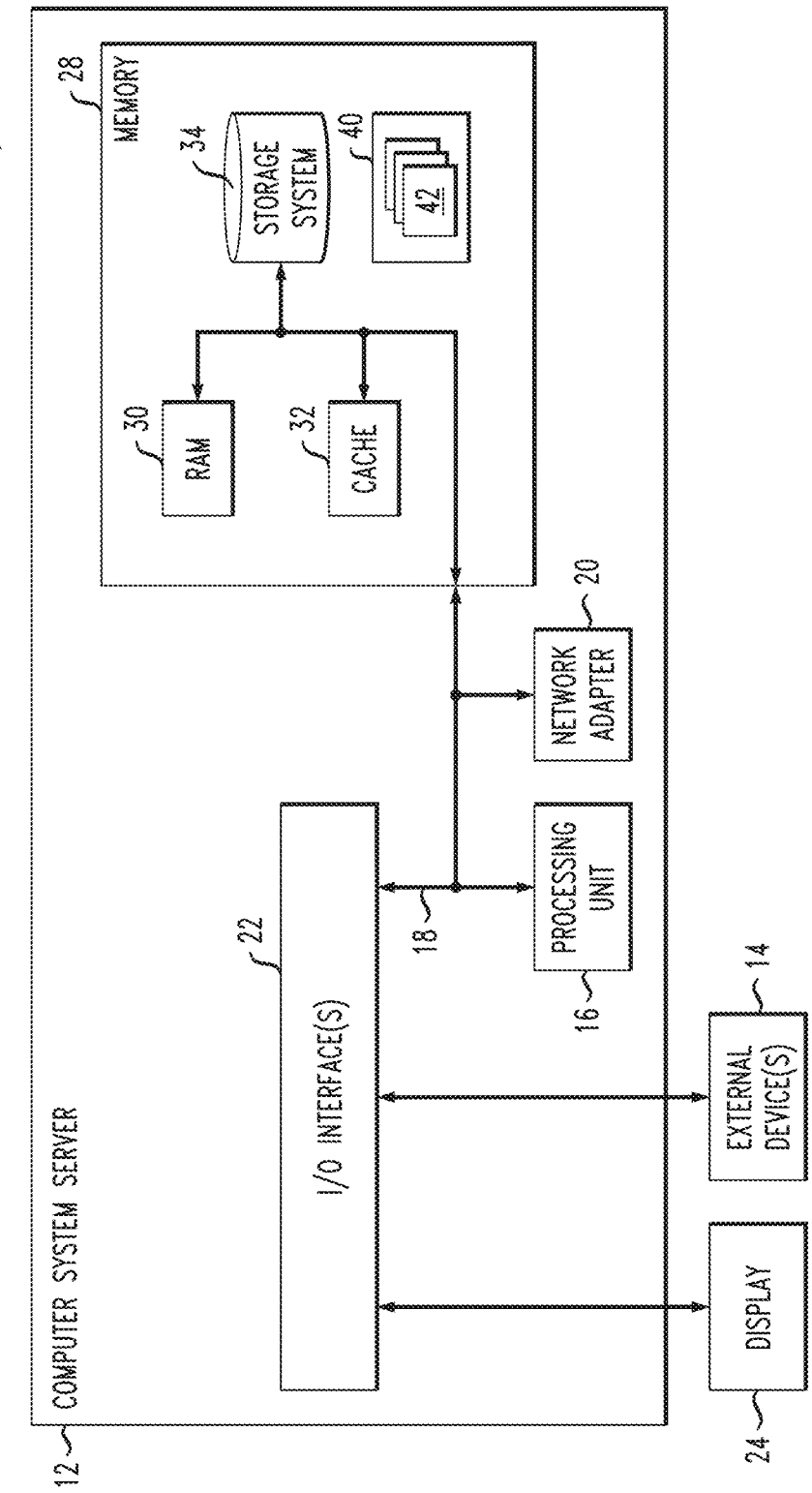
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. Consider, e.g., a cloud-based service 96 for fine-grained visual recognition in mobile augmented reality, located in layer 90.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for jointly learning a graph structure and graph embeddings, the method comprising:
    obtaining an initial noisy graph topology;
    generating, using a similarity learning component, an initial adjacency matrix using similarity learning and a similarity metric function;
    producing, from said initial adjacency matrix, using a graph neural network (GNN), an updated adjacency matrix with node embeddings;
    feeding back the node embeddings to revise the similarity learning component;
    repeating the generating, producing, and feeding back operations for a plurality of iterations;
    updating weights of the graph neural network only after a convergence of the updated adjacency matrices generated by the plurality of iterations;
    performing natural language processing on input from a human subject using a selected iteration of the updated adjacency matrix; and
    reconfiguring at least one network-based asset in accordance with a result of the natural language processing.

2. The method of claim 1, further comprising controlling, by a graph regularization component, a smoothness, a connectivity and a sparsity of a corresponding graph structure of the updated adjacency matrix using an adapted graph regularization technique.

3. The method of claim 1, wherein the similarity metric function comprises a weighted cosine similarity metric applied to obtain the updated adjacency matrix for all pairs of nodes of a corresponding graph structure.

4. The method of claim 3, wherein the weighted cosine similarity metric is defined using m weight vectors w, each weight vector w representing one perspective, to compute m independent similarity matrices s, an average of the m independent similarity matrices s, and a final similarity s based on:

$$s_{ij}^k = \cos(w_k \odot v_i, w_k \odot v_j), s_{ij} = \frac{1}{m}\sum_{k=1}^{m} s_{ij}^k$$

where $s_{ij}^k$ computes a cosine similarity between input vectors $v_i$ and $v_j$ for a k-th perspective, where each perspective considers one part of semantics captured in the input vectors $v_i$ and $v_j$.

5. The method of claim 4, wherein the adjacency matrix is designated as $A^{(t)}$ and is extracted from S by considering elements in S which are smaller than a non-negative threshold ε in an ε-neighborhood for each node, where:

$$A_{ij} = \begin{cases} s_{ij} & s_{ij} > \varepsilon \\ 0 & \text{otherwise} \end{cases}.$$

6. The method of claim 3, wherein the weighted cosine similarity metric is defined as:

$$s_{ij} = \cos(w \odot v_i, w \odot v_j)$$

where ⊙ denotes a Hadamard product and w comprises a learnable weight vector which has a same dimension as input vectors $v_i$ and $v_j$.

7. The method of claim 6, wherein each input vector $v_i$ and $v_j$ comprises one of raw node features and computed node embeddings.

8. The method of claim 1, wherein the updated adjacency matrix is learned by minimizing a joint loss function $\mathcal{L}$ based on $\mathcal{L} = \mathcal{L}_{pred} + \mathcal{L}_\mathcal{G}$, where $\mathcal{L}_{pred}$ is a prediction loss based on a downstream task and $\mathcal{L}_\mathcal{G}$ is a graph regularization loss.

9. The method of claim 8, wherein the graph regularization loss $\mathcal{L}_\mathcal{G}$ is defined by:

$$\mathcal{L}_\mathcal{G} = \alpha\Omega(A,X) + f(A)$$

where α is a non-negative hyperparameter, A is an adjacency matrix, X is a feature matrix, and Ω(A,X) is a smoothness loss.

10. The method of claim 8, wherein $\mathcal{L}_\mathcal{G}$ is based on a Frobenius norm of the updated adjacency matrix.

11. The method of claim 1, wherein the initial noisy graph topology is obtained from one of an original data graph and a graph constructed using a k-nearest neighbors (kNN) strategy, the graph is based on sequential data or a feature matrix of a corresponding application.

12. The method of claim 11, further comprising selecting an iteration of the updated adjacency matrix as a replacement for the initial noisy graph topology.

13. The method of claim 12, wherein the natural language processing is performed for a call center task.

14. The method of claim 1, wherein the repeating the generating, producing, and feeding back operations continues until a corresponding updated adjacency matrix designated as $A^{(t)}$ is sufficiently similar to a corresponding optimized graph for use in prediction based on a threshold ε to derive a final graph $\tilde{A}^{(t)}$.

15. The method of claim 14, wherein the final graph $\tilde{A}(t)$ is derived based on:

$$\tilde{A}^{(t)} = \lambda L^{(0)} + (1-\lambda)\{\eta f(A^{(t)}) + (1-\eta)f(A^{(1)})\}$$

where η is a hyperparameter, λ is a hyperparameter used to balance a trade-off between the updated adjacency matrix $A^{(t)}$ and the initial noisy graph topology designated as $A^{(0)}$, $L^{(0)}$ is a normalized adjacency matrix of the initial noisy graph topology $A^{(0)}$, defined as $L^{(0)} = D^{(0)-1/2} A^{(0)} D^{(0)-1/2}$, and where $D^{(0)}$ is a corresponding degree matrix.

16. The method of claim 1, wherein the repeating the generating, producing, and feeding back operations continues for a predefined number of iterations.

17. A non-transitory computer readable medium comprising computer executable instructions which when executed by a computer cause the computer to perform the method of:
   implementing a similarity learning component and a graph neural network (GNN);
   obtaining an initial noisy graph topology;
   generating, using the similarity learning component, an initial adjacency matrix using similarity learning and a similarity metric function;
   producing, from said initial adjacency matrix, using the graph neural network (GNN), an updated adjacency matrix with node embeddings;
   feeding back the node embeddings to revise the similarity learning component;
   repeating the generating, producing, and feeding back operations for a plurality of iterations;
   updating weights of the graph neural network only after a convergence of the updated adjacency matrices generated by the plurality of iterations;
   performing natural language processing on input from a human subject using a selected iteration of the updated adjacency matrix; and
   reconfiguring at least one network-based asset in accordance with a result of the natural language processing.

18. An apparatus comprising:
   a memory; and
   at least one processor, coupled to said memory, and operative to perform operations comprising:
   implementing a similarity learning component and a graph neural network (GNN);
   obtaining an initial noisy graph topology;
   generating, using the similarity learning component, an initial adjacency matrix using similarity learning and a similarity metric function;
   producing, from said initial adjacency matrix, using the graph neural network (GNN), an updated adjacency matrix with node embeddings;
   feeding back the node embeddings to revise the similarity learning component;
   repeating the generating, producing, and feeding back operations for a plurality of iterations;
   updating weights of the graph neural network only after a convergence of the updated adjacency matrices generated by the plurality of iterations;
   performing natural language processing on input from a human subject using a selected iteration of the updated adjacency matrix; and
   reconfiguring at least one network-based asset in accordance with a result of the natural language processing.

19. The apparatus of claim 18, the operations further comprising implementing a graph regularization component, and controlling, by the graph regularization component, a smoothness, a connectivity and a sparsity of a corresponding graph structure of the updated adjacency matrix using an adapted graph regularization technique.

20. The apparatus of claim 18, wherein the repeating the generating, producing, and feeding back operations continues until a corresponding updated adjacency matrix designated as $A^{(t)}$ is sufficiently similar to a corresponding optimized graph for use in prediction based on a threshold ε to derive a final graph $\tilde{A}^{(t)}$.

* * * * *